US009887633B2

(12) United States Patent
Choi (10) Patent No.: US 9,887,633 B2
(45) Date of Patent: Feb. 6, 2018

(54) RESONANT CONVERTER CONTROL TECHNIQUES TO MANAGE NEGATIVE SR CURRENT (71) Applicant: Fairchild Semiconductor Corporation, San Jose, CA (US)

(72) Inventor: Hang-Seok Choi, Bedford, NH (US)

(73) Assignee: Fairchild Semiconductor Corporation, Sunnyvale, CA (US)

( * ) Notice: Subject to any disclaimer, the term of this patent is extended or adjusted under 35 U.S.C. 154(b) by 201 days.

(21) Appl. No.: 14/616,987

(22) Filed: Feb. 9, 2015

(65) Prior Publication Data
US 2015/0229219 A1 Aug. 13, 2015

Related U.S. Application Data (60) Provisional application No. 61/938,443, filed on Feb. 11, 2014.

(51) Int. Cl.
*H02M 3/335* (2006.01)
*H02M 1/00* (2006.01)
(Continued)

(52) U.S. Cl.
CPC ... *H02M 3/33592* (2013.01); *H02M 3/33569* (2013.01); *H02M 2001/0058* (2013.01);
(Continued)

(58) Field of Classification Search
CPC ............. H02M 1/083; H02M 1/4241; H02M 3/33515; H02M 3/33523; H02M 3/33576; H02M 3/33592
(Continued)

(56) References Cited

U.S. PATENT DOCUMENTS 6,366,070 B1   4/2002  Cooke et al.
8,624,572 B2   1/2014  Hosotani
(Continued)

FOREIGN PATENT DOCUMENTS

CN   101677215   3/2010
CN   101728956   6/2010
CN   103138588   6/2013

OTHER PUBLICATIONS

FAN6208 Secondary-Said Synchronous Rectifier Controller for LLC Topology, Fairchild Semiconductor Corporation, Oct. 2014, 18 pages, Rev. 1.0.5.

*Primary Examiner* — Gary Nash
(74) *Attorney, Agent, or Firm* — Okamoto & Benedicto LLP (57) ABSTRACT This disclosure provides control techniques for a resonant converter. In one embodiment, a resonant converter controller includes predictive gate drive circuitry configured to generate a predictive gate drive signal indicative of a time duration from a rising edge of a first drive signal for controlling a conduction state of a first inverter switch of a resonant converter system to a synchronous rectifier (SR) current zero crossing instant of a first SR switch of the resonant converter system, wherein the first tracking signal is based on at least the first drive signal and a voltage drop across the first SR switch. The resonant converter controller may also include SR gate drive shrink circuitry configured to generate an SR gate drive turn on delay signal to increase delay of SR on times in response to detection of a decrease in load current demand of the resonant converter system.

22 Claims, 5 Drawing Sheets (51) Int. Cl.
  *H02M 5/42* (2006.01)
  *H02M 7/68* (2006.01)
  *H02M 3/24* (2006.01)
  *H02M 7/44* (2006.01)

(52) U.S. Cl.
  CPC ....... *Y02B 70/1433* (2013.01); *Y02B 70/1475* (2013.01); *Y02B 70/1491* (2013.01); *Y02P 80/112* (2015.11)

(58) Field of Classification Search
  USPC .................. 363/21.01–21.03, 78, 89, 97, 98
  See application file for complete search history.

(56) References Cited

U.S. PATENT DOCUMENTS

| | | |
|---|---|---|
| 2003/0067794 A1 | 4/2003 | Boylan et al. |
| 2004/0105280 A1 | 6/2004 | Odaka |
| 2008/0055942 A1* | 3/2008 | Tao .................. H02M 3/33592 363/21.03 |
| 2008/0186742 A1 | 8/2008 | Seong |
| 2009/0175056 A1* | 7/2009 | Choi ................. H02M 3/33569 363/21.06 |
| 2009/0196074 A1* | 8/2009 | Choi .................... H02M 3/337 363/21.02 |
| 2009/0251925 A1* | 10/2009 | Usui ................. H02M 3/33561 363/16 |
| 2010/0067262 A1 | 3/2010 | Chen et al. |
| 2010/0172157 A1* | 7/2010 | Chen ................ H02M 3/33592 363/21.02 |
| 2011/0080757 A1 | 4/2011 | Young |
| 2011/0150521 A1* | 6/2011 | Uchiyama ............. G03G 15/80 399/88 |
| 2011/0211370 A1* | 9/2011 | Luo .................. H02M 3/33592 363/21.02 |
| 2013/0336017 A1 | 12/2013 | Uno et al. |
| 2015/0023062 A1 | 1/2015 | Hyugaji et al. |

\* cited by examiner

FIG. 3c

RESONANT CONVERTER CONTROL TECHNIQUES TO MANAGE NEGATIVE SR CURRENT

PRIORITY

The present U.S. Non-Provisional Patent Application claims priority to U.S. Provisional Patent Application No. 61/938,443 entitled "Resonant Converter" that was filed on Feb. 11, 2014. The entire contents of the above-identified U.S. Provisional Patent Application is incorporated by reference herein.

FIELD

The present disclosure relates to a DC/DC converter system, and more particularly, to control techniques to manage negative SR current of a synchronous rectifier (SR).

BACKGROUND

Resonant converter systems may be used to convert an input voltage to an output voltage of desired characteristics. These systems generally include an input inverter stage, a transformer with a primary side coupled to the input stage and a secondary side coupled to an output synchronous rectifier stage to provide the output voltage to a load. Under certain conditions, however, for example when the load current demand is reduced, a negative current flow can be induced through the switches of the rectifier circuit which may cause switching noise and reduce efficiency.

SUMMARY

Generally, this disclosure provides control techniques for a resonant converter. In one control technique, a turn ON delay of the switches of the synchronous rectifier (SR) portion of the resonant converter is increased as the load current demand decreases. In some embodiments, load current demand may be measured based on a measurement of the current of the primary side of the resonant converter, rather than using the zero crossing current of the synchronous rectifier. For switching frequencies that are below the resonant frequency of the primary stage of the converter, the switches of the synchronous rectifier (SR) portion (SR switches) of the resonant converter are controlled based on a rising edge of the corresponding primary side switch and the turn off time of a corresponding SR switch. These control techniques reduce or eliminate negative currents at the SR switches, which can cause severe switching noise leading to the failure of the control circuit and can significantly impact overall output stability.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure provides control techniques for a resonant converter. In one control technique, a turn ON delay of the switches of the synchronous rectifier (SR) portion of the resonant converter is increased as the load current demand decreases. In some embodiments, load current demand may be measured based on a measurement of the current of the primary side of the resonant converter, rather than using the zero crossing current of the synchronous rectifier. For switching frequencies that are below the resonant frequency of the primary stage of the converter, the switches of the synchronous rectifier (SR) portion (SR switches) of the resonant converter are controlled based on a rising edge of the corresponding primary side switch and the turn off time of a corresponding SR switch. In general, for below resonance operation, each corresponding SR switch will be turned off prior to the falling edge of each corresponding primary side switch, while each corresponding SR switch will be turned on at the rising edge of the each corresponding primary side switch. The conduction time of respective SR switches is generally constant for below resonance operation. In another control technique, for switching frequencies that are above the resonant frequency of the primary stage of the converter, the SR switches are controlled based on the falling and rising edges of the voltage across the each corresponding SR switch. In general, for above resonance operation, each corresponding SR switch will be turned off after the falling edge of each corresponding primary side switch, while each corresponding SR switch will be turned on after the rising edge of the each corresponding primary side switch. The conduction time of respective SR switches may be variable for above resonance operation. In this manner, predictive drive control signals may be generated for the SR switches to prevent early or late turn off times of the SR switches when the switching frequency of the primary side changes rapidly. Thus, these control techniques reduce or eliminate negative currents at the SR switches, which can cause severe switching noise leading to the failure of the control circuit and can significantly impact overall output stability.

Figure 1:
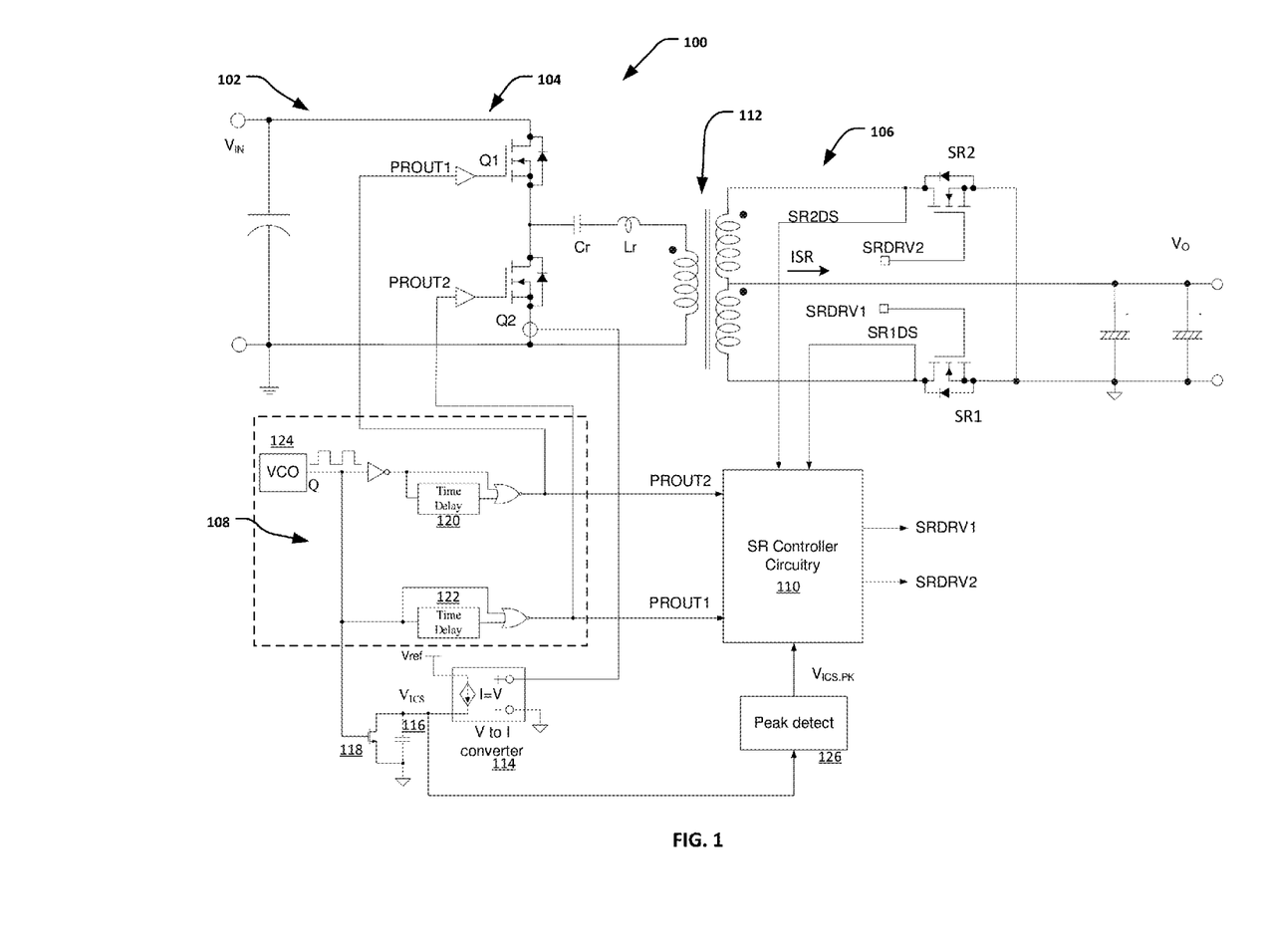
FIG. 1 illustrates a resonant converter system consistent with various embodiments of the present disclosure.

FIG. 1 illustrates a resonant converter system 100 consistent with various embodiments of the present disclosure. The converter system 100 of FIG. 1 includes converter circuitry 102 that includes a primary side stage 104 that includes inverter circuitry and a secondary side stage 106 that includes synchronous rectifier (SR) circuitry. The system 100 also includes pulse frequency modulation (PFM) controller circuitry 108 to control the operation of the inverter switches Q1 and Q2 of the primary side 104, and resonance-based SR controller circuitry 110 to control the operation of the SR switches SR1 and SR2 of the secondary side 106. The system 100 generally operates as a DC/DC resonant converter circuit that receives an input DC voltage (VIN) and generates an output DC voltage (Vo). The inverter circuitry of the primary side 104, in one embodiment, includes two switches Q1 and Q2 arranged in a half bridge configuration. The conduction state of the switches Q1 and Q2 are controlled by drive signals PROURT1 and PROUT2, respectively, generated by the PFM controller circuitry 108. The drive signals PROUT1 and PROUT2 may be generated in a well-known manner for PFM operation of a half bridge circuit, for example using voltage controlled oscillator (VCO) 124. The drive signals may be based on, at least in part, feedback information from the output Vo. Time delay circuits 120, 122 may be configured to provide a delay between the drive signals PROUT1 and PROUT2 to avoid cross conduction of switches Q1 and Q2 (i.e., preventing Q1 and Q2 from being on simultaneously).

The primary side 104 includes a resonant tank circuit that includes a transformer 112, resonant capacitor Cr and resonant inductor Lr. The resonant tank circuit operates to generate a sinusoidal waveform from the square wave produced by the switches Q1 and Q2. The resonant frequency (f0) of the system 100 is generally controlled by the resonant capacitor Cr and resonant inductor Lr. Generally, the gain of the DC/DC converter system 100 may be controlled by the switching frequency (fs) of the switches Q1 and Q2 in relation to the resonant frequency (f0). In some embodiments, the gain of the system 100 is larger when fs<f0 and smaller when fs>f0. Of course, in other embodiments the inverter circuitry may include, for example, a full bridge inverter topology, a push-pull inverter topology, Class C inverter topology, etc., and/or other well-known or after developed power supply topologies. In still other embodiments, the control of the switches Q1 and Q2 may include, for example, pulse width modulation (PWM) techniques, and/or other well-known or after developed power supply control techniques, etc.

The synchronous rectifier circuitry of the secondary side stage 106 includes rectifier switches SR1 and SR2 electrically coupled to the secondary side of the transformer 112 and configured to operate as a full wave rectifier of the sinusoidal signal at the secondary side of the transformer 112. The SR switches may include MOSFET devices that include body diodes biased in a source to drain direction (as shown). The conduction state of switch SR1 is controlled by the gate control signal SRDRV1 and the conduction state of the switch SR2 is controlled by the gate control signal SRDRV2. The SR controller circuitry 110 is configured to generate gate control signals SRDRV1 and SRDRV2 to control the conduction of SR1 and SR2, respectively, based on, at least in part, the primary side switch control signals PROUT1 and PROUT2 and the drain-source voltage of the SR switches, labeled as SR1DS and SR2DS. The controller 110 is configured to generate the control signals SRDRV1 and SRDRV2 so that the body diode conduction time is minimized and so that negative currents across the SR switches are reduced or eliminated, as described below. Integrator circuit 114 may be configured as a voltage to current converter circuit, which, along with associated components: switch 118, capacitor 116 and peak detect circuit 126, may be configured to provide an estimate of the peak primary side current for use by the SR controller circuit 110, as also to be described below.

Figure 2:
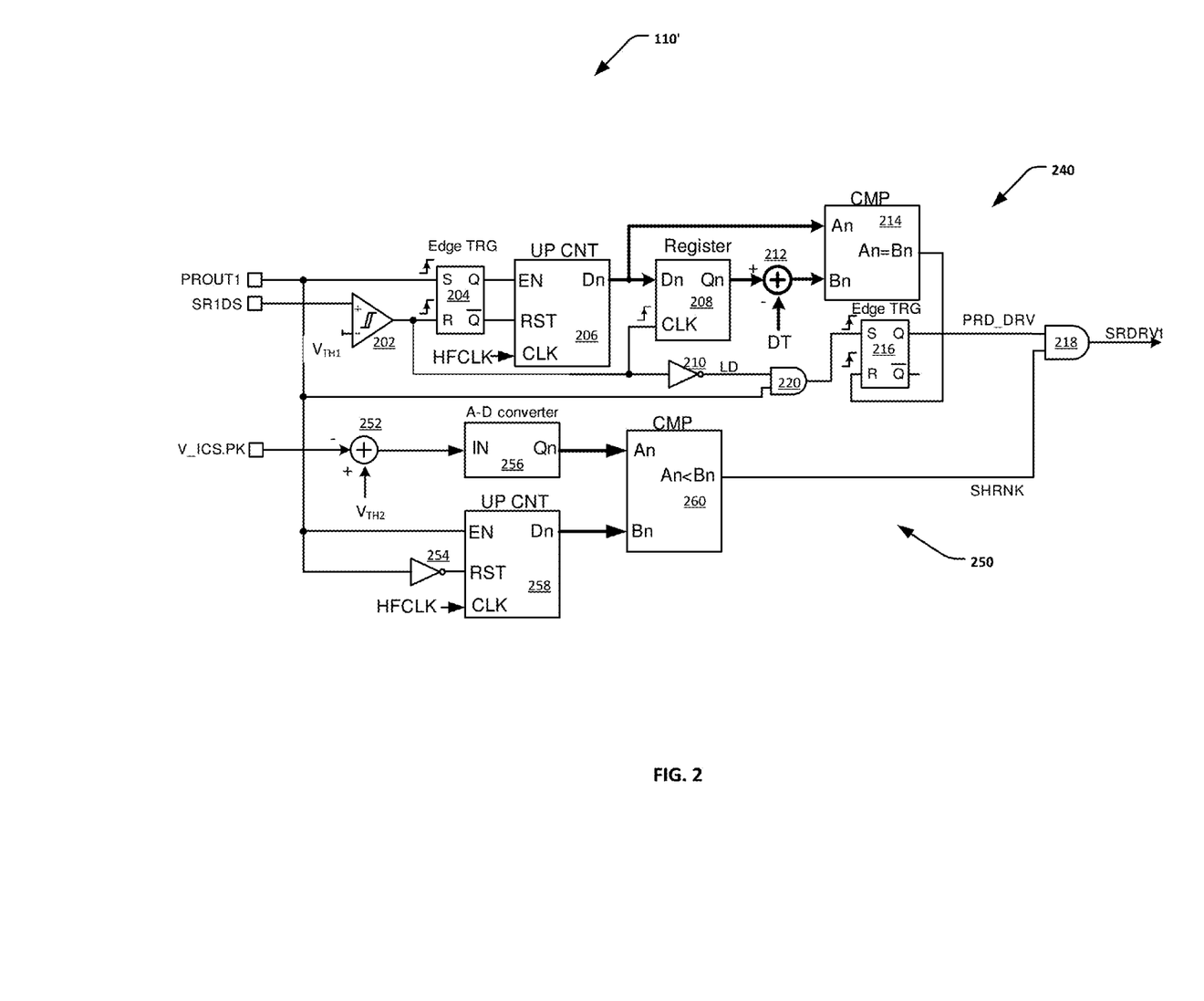
FIG. 2 illustrates an example resonance-based control circuitry consistent with one embodiment of the present disclosure.

FIG. 2 illustrates an example SR controller 110' consistent with one embodiment of the present disclosure. In this example, the controller 110' is for generating the SRDRV1 control signal to control the conduction state of the SR1 switch based on the primary side gate control signal PROUT1 and the drain-source voltage of the SR1 switch (SR1DS). It should be understood at the outset that the circuitry 110' may be substantially duplicated to generate the SRDRV2 control signal to control the conduction state of the SR2 switch based on the primary side gate control signal PROUT2 and the drain-source voltage of the SR2 switch (SR2DS).

Controller 110' generally includes predictive gate drive circuitry 240 configured to generate a predictive drive signal PRD_DRV. The PRD_DRV signal is indicative of a time duration from a rising edge of the PROUT1 signal to the turn off time of the corresponding SR1 switch. This information is used to determine the turn off time of the SR1 switch in the subsequent switching cycle. The controller 110' also includes SR gate shrink circuitry 250 configured to generate an SR gate drive turn on delay signal (also referred to as an SR gate shrink signal or SHRNK). The SHRNK signal is configured to increase the turn on delay of the SR1 switch as the load current demand decreases. The PRD_DRV and SHRNK signals are ANDed at 218 to generate a gate control signal SRDRV1 to control the conduction state of the SR1 switch.

The predictive gate drive circuitry 240 includes first comparator circuitry 202 configured to compare SR1DS with a threshold voltage VTH1. The comparator circuitry 202 may include hysteresis to prevent the comparator from changing states from small fluctuations of the SR1DS voltage, reduction of noise influence, etc. The threshold voltage VTH1 may be selected so that the comparator 202 accurately generates an output change when the SR1DS voltage changes states. The predictive gate drive circuitry 240 also includes first edge-triggered flip-flop circuitry 204 configured to generate first and second flip-flop output signals, Q and Q' (complimentary outputs), based on the gate control signal PROUT1 and the output of the comparator circuitry 202. The Q signal is HIGH when the output of comparator 202 is LOW (e.g., when SR1DS is below VTH1) and when the PROUT1 signal is HIGH, where Q is triggered HIGH at the rising edge of PROUT1. The Q' is HIGH when the output of comparator 202 is HIGH (when SR1DS is above VTH1). Up-counter circuitry 206 is configured to generate a running time count of the Q signal when the Q signal is HIGH. The running count, represented as Dn in FIG. 2, provides a time duration count of how long Q is HIGH in the current cycle of the primary side switches. The up-counter circuitry 206 is configured to start the count at the rising edge of the Q signal and terminate the count at the rising edge of the Q' signal (which operates to reset the up-counter circuitry 206). The running count signal Dn represents the time duration, in clock units from which all timing is based, of the Q signal from flip-flop 204 for the current cycle of the PROUT1 signal. The clock signal is referred to as HFCLK or high frequency clock.

The predictive gate drive circuitry 240 also includes register circuitry 208 configured to store the running count signal Dn as Qn. The register 208 stores the value of Qn at the rising edge of the output of comparator 202. Subtractor circuitry 212 is included and configured to subtract a predetermined time period, DT, from Qn. The output of subtractor 212 is labeled Bn in FIG. 2. The value of DT may be selected, for example, so that the on times of the SR switches do not overlap. Second comparator (digital comparator) circuitry 214 is configured to compare Dn (labeled An at the comparator 214) and Bn. An represents the current cycle (n+1) of the PROUT1 signal and Bn represents the previous cycle (n) of the PROUT1 signal. If An=Bn, the output of 214 goes HIGH, otherwise the output of 214 remains LOW. The predictive gate drive circuitry 240 also includes second edge-triggered flip-flop circuitry 216 that is configured to generate first and second flip-flop output signals, Q and Q' (complimentary outputs), based on the inverted output of the first comparator circuitry 202 (via inverter circuitry 210 gated with the PROUT1 signal) and the output of the second comparator circuitry 214. The Q output of 216 goes HIGH at the rising edge of LD signal and remains HIGH while An does not equal Bn (when An=Bn, the flip-flop 216 is reset and the Q output is LOW). The Q output of flip-flop circuitry is labeled PRD_DRV in FIG. 2.

Controller 110' also generally includes SR gate shrink circuitry 250 configured to increase the turn on delay of the SR1 switch as the load current demand decreases. The SR gate shrink circuitry 250 may be configured to receive the V_ICS.PK signal, which represents the load current demand based on a measurement of current through the primary side (Q2). With reference back to FIG. 1, the V to I converter circuit 114 senses the voltage at Q2 and converts that voltage to a proportional current, for example using integration, which charges capacitor C_ICS 116. The peak of that capacitor voltage, V_ICS.PK, which is measured by peak detect circuit 126, is proportional to the input power associated with VIN. MOSFET 118 may be turned on when VCO 124 is high to enable capacitor 116 to charge. Similarly, MOSFET 118 turns off when VCO goes low, causing capacitor 116 to discharge to ground in preparation for the next cycle of the VCO. The turn on delay of the SR switches may be controlled based on this input power estimation (V_ICS.PK) and the turn on delay may be increased as the load decreases. Thus, the SR switch is not turned on until there is a positive current across the SR switches, avoiding efficiency decreasing effects associated with negative current through the SR switches. It will be appreciated that direct measurement of the current through the SR switches may be difficult, particularly near the zero crossing. Thus, an embodiment of the present disclosure measures the primary side current, at Q2, as described above, to estimate the SR current.

The SR gate shrink circuitry 250 includes a subtraction circuit 252 to calculate the difference between the V_ICS.PK signal and a provided second threshold voltage VTH2, which represents a percentage of the load (e.g., 20% of full power, 40% of full power, etc.). Additional turn on delay for the SR switch is applied when the converter is operating below the VTH2 threshold. Up counter circuit 258 is configured to generate a running time count corresponding to when PROUT1 is high. When PROUT1 is high, the counter is enabled. When PROUT1 goes low, the counter stops and resets. The output Dn is a bit stream indicating the length of time that PROUT1 is on, which is provided to the Bn input of comparator 260. The SR gate shrink circuitry 250 also includes analog to digital (A-D) converter 256 to digitize the difference between V_ICS.PK and VTH2 to be provided to the An input of comparator 260.

Comparator 260 is configured to generate the SHRNK signal as follows. If V_ICS.PK is greater than VTH2, then the A/D converter 256 output Qn is zero and the comparator 260 output (SHRNK) remain high, as long as PROUT1 is high, which offers no turn on delay. This is consistent with the desire to adjust the turn on of the SR switches based on load conditions. If V_ICS.PK is less than VTH2, then the A/D output (Qn) represents how much lower the power being delivered is, compared to the threshold. As V_ICS.PK decreases, Qn increases, indicating that the power delivered to the load is decreasing. As Qn increases, comparator output SHRNK stays low which in turn drives SRDRV1 low to delay the SR turn on. The SR turn on delay continues until SHRNK goes high again, for example because V_ICS.PK increases back above VTH2.

Figure 3A:
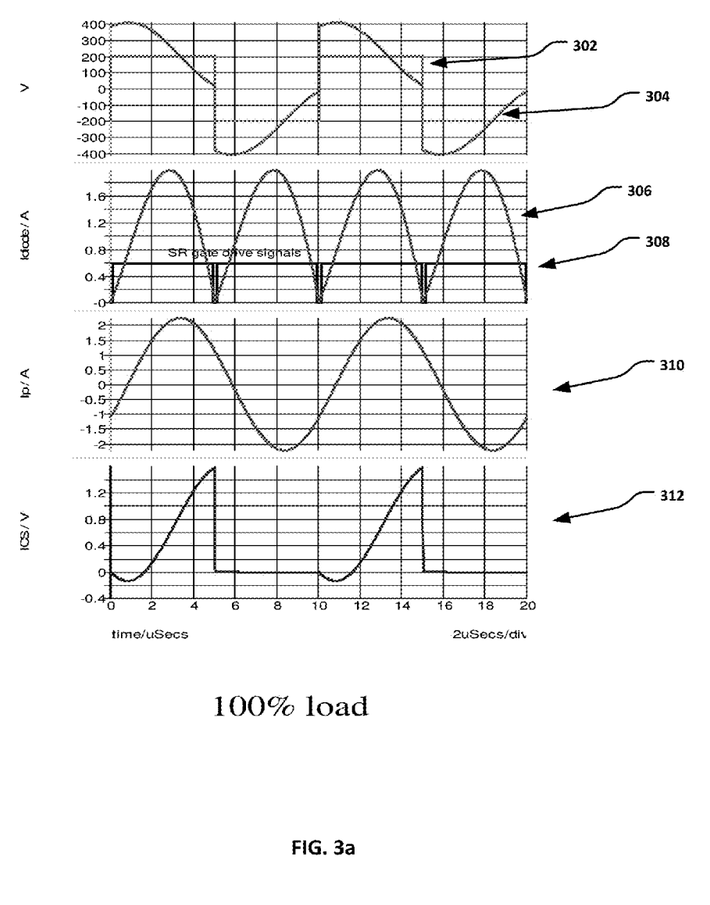
FIGS. 3a, 3b, 3c illustrate example simulation waveforms of various signals for resonance converter operation consistent with one embodiment of the present disclosure.
Figure 3B:
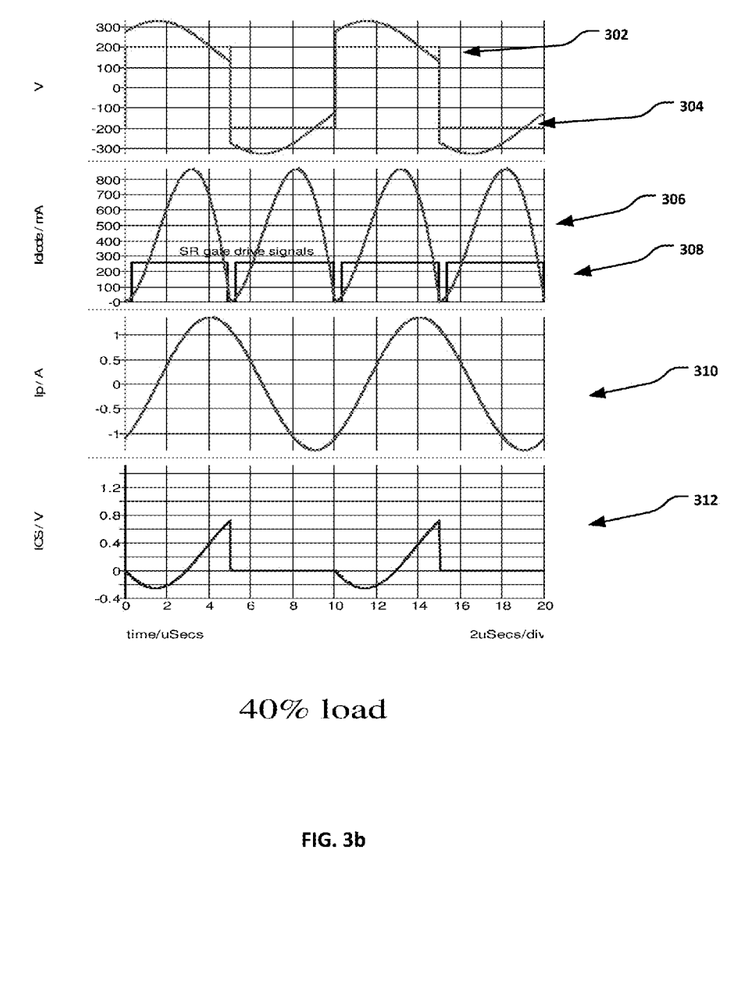
Figure 3C:
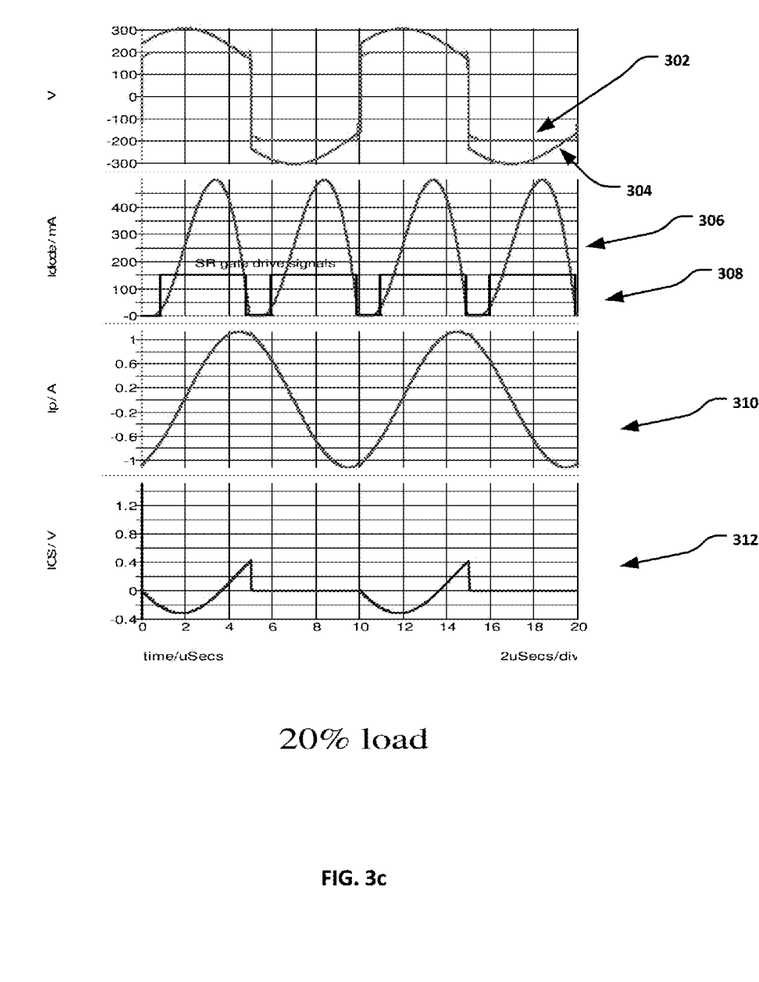

FIGS. 3a, 3b and 3c illustrate example simulation waveforms of various signals at multiple load conditions (100%, 40% and 20% respectively) consistent with one embodiment of the present disclosure. With continued reference to FIGS. 1 and 2, the simulation waveforms 302-312 illustrate various signal waveforms through a plurality of cycles. Waveform 302 illustrates a voltage across the primary of the transformer 112. Waveform 304 illustrates a voltage across both inductor Lr and the primary side of transformer 112. It can be seen that the voltage 302 is clamped at 200 volts, in this example, at higher loads (FIGS. 3a and 3b), but begins to reflect the 304 waveform at lower loads (FIG. 3c). Waveform 306 illustrates the ISR current shown in the secondary stage circuit 106 of FIG. 1. Waveform 308 illustrates the SR gate drive signals. Waveform 310 illustrates the current through the primary side of transformer 112. Waveform 312 illustrates the ICS signal shown associated with circuit 114 of FIG. 1.

The term "switches" may be embodied as MOSFET switches (e.g. individual NMOS and/or PMOS elements), BJT switches and/or other switching circuits known in the art. In addition, "circuitry" or "circuit", as used in any embodiment herein, may comprise, for example, singly or in any combination, hardwired circuitry, programmable circuitry, state machine circuitry, and/or circuitry that is included in a larger system, for example, elements that may be included in an integrated circuit. In addition, the example embodiments described herein have used certain types of devices by convention, e.g., NMOS switches that are turned on when a gate control signal is high and turned off when a gate control signal is low. In other embodiments, active low devices may be used (e.g., PMOS devices). In such embodiments the timing and signal diagrams described herein would change to reflect the operation of an active low device, as is well-understood in the art.

According to one aspect there is provided a resonant converter system. The resonant converter system may include transformer circuitry including a primary side and a secondary side, first stage circuitry coupled to the primary side, the first stage circuitry including inverter circuitry having a first inverter switch, a second inverter switch and resonant tank circuitry, pulse frequency modulation (PFM) controller circuitry configured to generate a first drive signal and a second drive signal to control on and off times of the first and second inverter switches, respectively, second stage circuitry coupled to the secondary side, the second stage circuitry including synchronous rectifier (SR) circuitry having a first SR switch and a second SR switch corresponding to the first and second inverter switches, respectively and SR controller circuitry configured to generate control signals to control the on and off times of the first and second SR switches, respectively, based on at least the first and second drive signals and further configured to increase delay of said on times in response to detection of a decrease in load current demand of the resonant converter system.

According to another aspect there is provided a resonant converter controller. The resonant converter controller may include predictive gate drive circuitry configured to generate a predictive gate drive signal indicative of a time duration from a rising edge of a first drive signal for controlling a conduction state of a first inverter switch of a resonant converter system to a synchronous rectifier (SR) current zero crossing instant of a first SR switch of the resonant converter system, wherein the first tracking signal is based on at least the first drive signal and a voltage drop across the first SR switch. The resonant converter controller may also include SR gate drive shrink circuitry configured to generate an SR gate drive turn on delay signal to increase delay of SR on times in response to detection of a decrease in load current demand of the resonant converter system.

According to another aspect there is provided a method for controlling the operation of a resonant converter system. The method may include generating first and second drive signals to control on and off times of first and second inverter switches, respectively, in a first stage of a resonant converter system, determining voltage drops across each of first and second synchronous rectifier (SR) switches in a second stage of the resonant converter system, the first and second SR switches corresponding to the first and second inverter switches, respectively, generating control signals to control on and off times of the first and second SR switches, respectively, based on at least the first and second drive signals and voltage drops across the first and second SR switches, detecting a decrease in load current demand of the resonant converter system and increasing delay of the on times in response to the detection.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A resonant converter system, comprising:
   transformer circuitry including a primary side and a secondary side;
   first stage circuitry coupled to said primary side, said first stage circuitry including inverter circuitry having a first inverter switch, a second inverter switch and resonant tank circuitry;
   pulse frequency modulation (PFM) controller circuitry configured to generate a first drive signal and a second drive signal to control on and off times of said first and second inverter switches, respectively;
   second stage circuitry coupled to said secondary side, said second stage circuitry including synchronous rectifier (SR) circuitry having a first SR switch and a second SR switch corresponding to said first and second inverter switches, respectively; and
   SR controller circuitry configured to generate control signals to control said on and off times of said first and second SR switches, respectively, based on at least said first and second drive signals, to detect a decrease in a load current demand of said resonant converter system, and to increase delay of said on times in response to detection of the decrease in load current demand of said resonant converter system.

2. The resonant converter system of claim 1, further comprising an integration circuit configured to convert measured current through said second inverter switch to a voltage.

3. The resonant converter system of claim 2, further comprising a peak detect circuit configured to detect a peak of said converted measured current for estimation of said load current demand.

4. The resonant converter system of claim 3, wherein said SR controller circuitry is further configured to generate a gate drive turn on delay signal based on a difference between said detected peak voltage and a threshold voltage, said threshold voltage representing a percentage of a full power load of said resonant converter.

5. The resonant converter system of claim 4, wherein said SR controller circuitry is further configured to generate a predictive gate drive signal for each SR switch, said predictive gate drive signal having a time duration from approximately a rising edge of said drive signal of the corresponding inverter switch to an SR current zero crossing instant of said SR switch.

6. The resonant converter system of claim 5, wherein said SR controller circuitry is further configured to turn off each SR switch based at least on a result of a logical AND of said predictive gate drive signal and said gate drive turn on delay signal.

7. The resonant converter system of claim 1, wherein said increased delay of said on times, in response to detection of a decrease in load current demand, prevents negative current flow through said SR switches.

8. The resonant converter system of claim 1, wherein said PFM controller circuitry is further configured to generate said first and second drive signals using feedback based at least on an output voltage of said resonant converter circuitry.

9. A resonant converter controller, comprising:
   predictive gate drive circuitry configured to generate a predictive gate drive signal indicative of a time duration from a rising edge of a first drive signal for controlling a conduction state of a first inverter switch of a resonant converter system to a synchronous rectifier (SR) current zero crossing instant of a first SR switch of said resonant converter system, wherein a first tracking signal is based on at least said first drive signal and a voltage drop across said first SR switch; and
   SR gate drive shrink circuitry configured to detect a decrease in load current demand of said resonant converter system, and to generate an SR gate drive turn on delay signal to increase delay of SR on times in response to detection of the decrease in load current demand of said resonant converter system.

10. The resonant converter controller of claim 9, wherein said predictive gate drive circuitry comprises at least an analog comparator, a first edge-triggered flip-flop, a counter, a register, an inverter, a digital comparator, and a second edge-triggered flip-flop.

11. The resonant converter controller of claim 9, wherein said SR gate drive shrink circuitry comprises at least an analog subtraction circuit, a counter, an analog to digital converter, and a digital comparator.

12. The resonant converter controller of claim 9, further comprising an integration circuit configured to convert measured current through a second inverter switch to a voltage.

13. The resonant converter controller of claim 12, further comprising a peak detect circuit configured to detect a peak of said converted measured current for estimation of said load current demand.

14. The resonant converter controller of claim 13, wherein said SR gate drive shrink circuitry is further configured to generate said gate drive turn on delay signal based on a difference between said detected peak voltage and a threshold voltage, said threshold voltage representing a percentage of a full power load of said resonant converter.

15. The resonant converter controller of claim 9, further comprising logic circuitry including at least a logical AND configured to receive said predictive gate drive signal and said gate drive turn on delay signal and generate a control signal for said first SR switch.

16. A method comprising:
generating first and second drive signals to control on and off times of first and second inverter switches, respectively, in a first stage of a resonant converter system;
determining voltage drops across each of first and second synchronous rectifier (SR) switches in a second stage of said resonant converter system, said first and second SR switches corresponding to said first and second inverter switches, respectively;
generating control signals to control on and off times of said first and second SR switches, respectively, based on at least said first and second drive signals and voltage drops across said first and second SR switches;
detecting a decrease in load current demand of said resonant converter system; and
increasing delay of said on times in response to said detection of the decrease in load current of said resonant converter system.

17. The method of claim 16, further comprising:
measuring current through said second inverter switch, converting said measured current to a voltage based on integration of said measured current and estimating said load current demand based on a detected peak of said voltage.

18. The method of claim 17, further comprising:
generating a gate drive turn on delay signal based on a difference between said detected peak voltage and a threshold voltage, said threshold voltage representing a percentage of a full power load of said resonant converter.

19. The method of claim 18, further comprising:
generating a predictive gate drive signal for each SR switch, said predictive gate drive signal having a time duration from approximately a rising edge of said drive signal of the corresponding inverter switch to an SR current zero crossing instant of said SR switch.

20. The method of claim 19, further comprising:
turning off each SR switch based at least on a result of a logical AND of said predictive gate drive signal and said gate drive turn on delay signal.

21. The method of claim 16, wherein said increased delay of said on times, in response to detection of a decrease in load current demand, prevents negative current flow through said SR switches.

22. The method of claim 16, further comprising:
generating said first and second drive signals using feedback based at least on an output voltage of said resonant converter circuitry.

* * * * *